United States Patent Office 3,457,092
Patented July 22, 1969

3,457,092
GRANULAR ELECTRICALLY INSULATING MATERIAL OF MAGNESIA AND FUSED ZIRCON
Reino O. Tervo, Ottawa, Ontario, Canada, assignor to Norton Company, Worcester, Mass., a corporation of Massachusetts
No Drawing. Filed Oct. 25, 1966, Ser. No. 589,196
Int. Cl. C04b 35/48; H01b 3/02, 3/12
U.S. Cl. 106—57
5 Claims

ABSTRACT OF THE DISCLOSURE

It has been found that the addition of from one-half to 8% by weight of fused zircon to granular magnesium oxide improves the electrical properties of fused magnesium oxide for use in sheathed electrical resistance heating elements.

BACKGROUND OF THE INVENTION

This invention relates to granular refractory materials for use as electrical insulating material in sheathed resistance heating elements. U.S. Patent 2,483,839 to Oakley et al. discloses a type of heating element to which this invention is applicable. U.S. Patent 2,798,002 discloses fused magnesia which is employed in granular form in the heating elements such as disclosed in the Oakley patent. To minimize the danger of electrical shock in equipment using this type of heating element, it is essential that the insulation have a high resistivity at the operating temperature which may reach as high as 900° C. on the sheath. Fused magnesium oxide such as disclosed in the Porter patent cited above is particularly suitable for use as electrical insulation in tubular heating elements because of its combination of high electrical resistivity and good thermal conductivity properties. Volume 83 of the transactions of the Electrochemical Society (1943) pages 191 to 203 describes a method for the determination of the specific resistance of compressed granular magnesium oxide as used in resistance heating elements. The resistivity values given in this specification are determined by the method described in that paper except that the test rods and cylinders instead of being cleaned in the way described in the article are pickled anodically in a 10% by volume solution of sulphuric acid at a current density of about 1.5 amperes per square inch. They are then wiped, dryed, and heated to 1225° C. in a slow stream of hydrogen. Removed from the furnace while still warm they are immediately placed in a dessicator and kept over activated alumina. All subsequent handling is done with tongs and rubber gloves.

In the past various treatments or additions to fused magnesium oxide have been suggested for improving the electrical properties of the material. U.S. Patent 2,669,636 to Rawles, suggests the addition of from 60 to 80% by weight of zirconium silicate to granular fused magnesium oxide. The patent states that while zirconium silicate alone has poorer electrically insulating properties than magnesium oxide, in mixtures of zirconium silicate and magnesium oxide of the above proportions, these poorer electrically insulating properties are offset by the better heat conducting properties of the zirconium silicate so that the heater elements containing such mixtures are a satisfactory compromise between heat conductivity and electrical insulating properties.

In view of the discovery of the subject matter of the present invention, the surprisingly beneficial effects of the addition of fused zircon to electrical grade magnesia, the resistivity values of several materials alone or in combination with fused magnesia were measured for comparison. It was found that fused zircon had resistivity values at 900° C. and at 980° C. of less than 1 megohm inch. It was also found that the addition of fused silica in the amount of from ½ to 8% to electrical grade fused magnesia although it increased the electrical resistivity of the material imparted undesirable mechanical properties to the mixture with regard to its use in the fabrication of heating elements, and it was found that the addition of fused zirconia in similar amounts to electrical grade fused magnesia impaired the electrical properties of the material. Finally, it was found that the addition of zircon (unfused) to fused magnesia, in the same quantities, decreased the electrical resistivity of the magnesia.

Zircon is the mineral name for the compound zirconium silicate, $ZrSiO_4$. Zircon is a true compound existing in a crystalline form. By fused zircon we mean zircon which has been melted to the liquid state and cooled. When so treated the material is no longer the compound zirconium silicate but a mixture of silica glass and crystalline zirconium oxide. When crushed to the grain size employed in the present invention, that is from 40 on down to 325 and finer grit size, all of the individual grains each contain both $SiO_2$ and $ZrO_2$.

DESCRIPTION OF THE INVENTION

Significant improvement of the electrical resistivity of granular fused magnesium oxide can be achieved by a mechanical addition of granular fused zircon sand, between ½ to 8% by weight of the total mixture. The preferred addition is about 2%.

It is interesting to note that the addition has no significant effect on the resistivity of the magnesia grain until the mixture is heated up to about 900° C. to 1100° C. After heating to 900° C. the beneficial effect is retained even after subsequent cooling of the material. Since the conditions of use of the insulating material of this invention will normally involve a temperature over 900° C. it is unnecessary to preheat the material to this temperature prior to incorporation into the heating element. The nature of the reaction which takes place upon heating to 900° or higher is not known.

Example I

Fused zircon sand, 100F sieve size, was mixed, by shaking in a bottle, with commercially available fused magnesia, 40F sieve size, two parts of fused zircon by weight to 98 parts of magnesia. The resistivity of the mixture was 38.8 megohm-inches at 980° C., while the magnesia, without the addition of the fused zircon, had a resistivity of 26.3 megohm-inches.

The screen analysis of the fused magnesia employed in this example is, typically:

| | |
|---|---|
| Percent on 40 mesh | Zero |
| Percent through 40 on 60 mesh | 29.6 |
| Percent through 60 on 80 mesh | 23.0 |
| Percent through 80 on 200 mesh | 35.5 |
| Percent through 300 on 325 mesh | 7.0 |
| Percent through 325 on 425 mesh | 4.5 |
| Percent through 425 mesh | 1.0 |

This magnesia is designated as Magnorite (trademark) 214, and is available from Norton Company, Worcester, Mass. The screen analysis is based on U.S. Standard Sieves, except the 425 mesh screen which had square openings 33 microns on a side.

The specifications for this grain are that it all pass through a 40 mesh screen, 25 to 31% be through 40 mesh on 60 mesh, 5 to 11% be through 300 mesh on 325 mesh, and no more than 6% pass the 325 mesh screen.

The fused zircon was of a size that all of it passed a 100 mesh screen. The sizing was otherwise not controlled, the product being such sizing as was naturally formed in the crushing operation by a roll crusher. In such material a considerable amount of fines, capable of passing through a 325 mesh screen is produced. It is desirable that at least 20% of the weight of the fused zircon material is capable of passing a 325 mesh screen. Good results are achieved when the particle size distribution of the fused zircon is within or smaller than the particle size distribution specified for the magnesia, that is, no substantial amount of the fused zircon should have a particle size larger than the maximum size of the fused magnesia.

Example II

A sample of fused magnesia, similar to that of Example I, but with a resistivity at 980° C. of 17.4 megohm-inches, when mixed with 4% by weight of 100F fused zircon sand had a resistivity at 980° C. of 31.7 megohm-inches Additions of fused zircon sand from ½ to 8% by weight have proved beneficial, but additions of about 2% by weight are preferred.

The zircon has a theoretical analysis of thirty-three percent silica and 67 percent zirconia, by weight. The fused zircon of Example I had a silica content of 21.2% and the fused zircon of Example II had a silica content of 28%. Thus the material need not be stoichiometric and good results can be achieved with both an excess of silica and an excess of zirconia.

In general the fused zircon material tends to be somewhat deficient in silica. This is not necessary, however, and can be avoided by addition of silica to the furnace charge to make up for silica lost through reduction and volatilization. Rapid quenching of the product facilitates crushing and can be achieved by air quenching or other well known rapid cooling techniques.

What is claimed is:

1. An electrically insulating material for sheathed electrical resistance elements consisting essentially of particulate fused magnesium oxide consisting essentially of particles capable of passing a 40 mesh screen intimately mixed with from one-half to 8% of particulate fused zircon having a particle size distribution at least as small as the particle size distribution of the magnesium oxide.

2. An electrically insulating material as in Claim 1 in which the fused zircon addition is capable of passing through a 100 mesh screen.

3. An electrically insulating material as in claim 2 in which at least 20% of the fused zircon is capable of passing through a 325 mesh screen.

4. A method of producing a granular electrically insulating material for sheathed electrical resistance elements comprising subjecting a mixture of granular magnesium oxide and granular fused zircon having a particle size capable of passing through a 40 mesh screen, to a temperature of from 900° C. to 1100° C., the fused zircon being present in an amount of from one-half to 8% of the total mixture by weight.

5. A granular material, consisting essentially of 40 mesh and finer particles, for sheathed electrical resistance elements consisting essentially of magnesium oxide, zirconia, and silica in which the total weight of silica and zirconia amounts for from one-half of 8% of the weight of the mixture, in which the zirconia and silica are present in the form of fused zircon whereby the zirconia is present in a crystalline state and whereby the silica is present in a glassy state.

References Cited

UNITED STATES PATENTS 2,669,636   2/1954   Rawles _____ 106—57

JAMES E. POER, Primary Examiner

U.S. Cl. X.R.

106—58; 252—63.5